J. H. Pratt,

Wringer.

No 4,343. Reissued Apr. 18. 1871.

Witnesses.

Frank Fuller

Charles H. Mills

James H. Pratt.

by his Attorney.

Frederick Curtis.

N. PETERS, PHOTO-LITHOGRAPHER, WASHINGTON, D. C.

United States Patent Office.

JAMES H. PRATT, OF LYNN, MASSACHUSETTS, ASSIGNOR TO HIMSELF AND BENJAMIN F. LARRABEE, OF SAME PLACE.

Letters Patent No. 112,074, dated February 21, 1871; reissue No. 4,343, dated April 18, 1871.

IMPROVEMENT IN CLOTHES-WRINGING HOOKS.

The Schedule referred to in these Letters Patent and making part of the same.

*To all whom it may concern:*

Be it known that I, JAMES H. PRATT, of Lynn, in the county of Essex and Commonwealth of Massachusetts, have made an invention of certain Improvements in Clothes-Wringing Hooks; and do hereby declare the following to be a full, clear, and exact description thereof, due reference being had to the accompanying drawing making part of this specification.

The purpose of this invention is to provide an inexpensive substitute for the wringer now generally in use, by the aid of which the washerwoman may, in wringing articles of clothing by hand, find her labor lessened and her work accomplished more effectually; and to carry out such purpose I employ a metallic curved horn or hook, firmly attached to and rising above the edge of the tub, and so constructed or provided as to be readily detached therefrom when occasion requires.

To enable those skilled in the art to understand and use my invention, I will now proceed to describe the manner in which the same is or may be carried into effect by reference to the accompanying drawing, in which—

Figure 1:
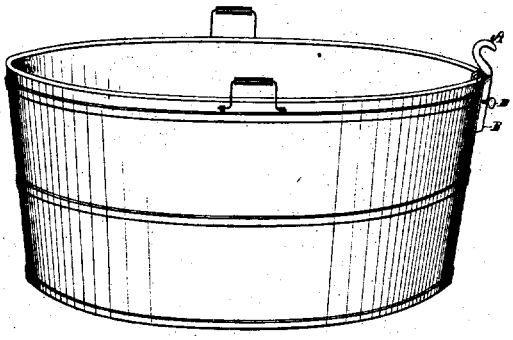
Figure 1 is a perspective view of an ordinary wash-tub, to which is applied a wringing-hook provided with one form of clamp which I find well adapted to carry out my invention.
Figure 2:
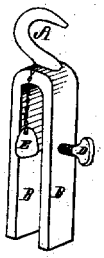
Figure 2 is a perspective view of the wringer-hook, detached from the tub.

The drawing represents, at A, a rigid horn or hook, projecting from or making part of a yoke or furcated metallic block, B, the two prongs of which embrace the wall of the tub, a thumb-screw, D, screwing through the outermost one in such manner as to abut against the side of the tub and confine it tightly in place between the two, a flat metallic plate or shield, E, being interposed between the advance end of the thumb-screw and the body of the tub, in order to protect the latter from indentation and injury by the screw, which would otherwise result.

The shield E may be secured to the hook or its clasp by a chain, or it may be produced in the form of a disk and swiveled to the front end of the screw, which would be much more convenient, and the whole device is to be manufactured preferably from cast-iron and galvanized.

In practice the yoke B is attached to the wall of the tub or other utensil, as shown in fig. 1 of the drawing, the thumb-screw being advanced tightly against such wall to insure stability and firmness of the hook.

In wringing various articles of clothing or other fabrics they are to be doubled about the hook and passed over the tub, the ends being seized by the two hands of the operator, who is by this means enabled to exert a much greater force to twist and wring the articles than the use of one hand alone would afford, the hook serving the function substantially of a third hand.

*Claim.*

I claim—

A wringer-hook, composed of a hook proper and a clamping device, substantially as described, for securing it to the side of the tub.

JAMES H. PRATT.

Witnesses:
FRED. CURTIS,
CHARLES H. MILLS.